(12) United States Patent
Tezuka et al.

(10) Patent No.: US 7,039,926 B2
(45) Date of Patent: May 2, 2006

(54) OPTICAL DISK APPARATUS WITH FINE TRACKING MECHANISM

(75) Inventors: Koichi Tezuka, Kawasaki (JP); Hitoshi Komoriya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 10/136,988

(22) Filed: May 2, 2002

(65) Prior Publication Data

US 2002/0172136 A1 Nov. 21, 2002

(30) Foreign Application Priority Data

May 17, 2001 (JP) ........................................ 2001-147616

(51) Int. Cl.
*G11B 7/00* (2006.01)

(52) U.S. Cl. ..................................................... 720/681
(58) Field of Classification Search ............ 369/112.23, 369/112.26, 221; 720/681
See application file for complete search history.

(56) References Cited

U.S. PATENT DOCUMENTS

| 5,536,988 A | * | 7/1996 | Zhang et al. .............. 310/309 |
| 5,828,644 A | * | 10/1998 | Gage et al. ............ 369/112.24 |
| 5,920,978 A | | 7/1999 | Koshikawa et al. ..... 29/603.12 |
| 6,055,222 A | * | 4/2000 | Knight .................... 369/13.13 |
| 6,061,322 A | * | 5/2000 | Jain et al. ..................... 369/99 |
| 6,084,846 A | * | 7/2000 | Jordache et al. ....... 369/112.23 |
| 6,400,655 B1 | * | 6/2002 | Kim ........................ 369/13.33 |
| 6,582,630 B1 | * | 6/2003 | Jain et al. .................... 264/1.1 |

FOREIGN PATENT DOCUMENTS

| JP | 5-076186 | | 3/1993 |
| JP | 5-076187 | | 3/1993 |
| JP | 09009649 A | * | 1/1997 |

OTHER PUBLICATIONS

Machine translation of Japanese Publication 09–9649, Published Jan. 10, 1997.*

* cited by examiner

*Primary Examiner*—David Ometz
*Assistant Examiner*—Mark Blouin
(74) *Attorney, Agent, or Firm*—Greer, Burns & Crain, Ltd.

(57) ABSTRACT

An optical disk apparatus includes an objective lens system for producing a beam spot on an optical disk, a slider movable relative to the optical disk, and a fine tracking mechanism for shifting the beam spot in a radial direction of the optical disk. The objective lens system is composed of a first lens and a second lens. The second lens is held by the slider and disposed closer to the optical disk than the first lens is. The tracking mechanism shifts the second lens in the radial direction of the optical disk for tracking control.

17 Claims, 11 Drawing Sheets

OPTICAL DISK APPARATUS WITH FINE TRACKING MECHANISM

BACKGROUND OF THE INVENTION

1. Field of the Invention

The present invention relates to an optical disk apparatus that uses laser beams to retrieve digital data stored in an optical data storage medium. The disk apparatus may also be designed to write data to an optical disk only once or any number of times by magnetic field modulation or optical strength modulation for example.

2. Description of the Related Art

FIGS. 11 and 12 of the accompanying drawings show two different types of conventional optical disk apparatus provided with a slider 80 or 90, respectively. The disk apparatus 8 of FIG. 11 is a linear arm type including a carriage 81 for supporting the slider 80, an objective lens system 82 and a tracking mechanism 83. The disk apparatus 9 of FIG. 12 is a swing arm type including a carriage 91 for supporting the slider 90, an objective lens system 92 and a tracking mechanism 93.

To attain high numerical aperture (NA), each of the lens systems 82 and 92 is composed of two lenses 82a~82b or 92a~92b. Each of the tracking mechanisms 83 and 93 is designed to enable minute shifting of the beam spot in the radial direction of the optical disk D (see the double-headed arrow A-B) so that the beam spot is to be located on the required track of the storage disk.

In the disk apparatus 8 of FIG. 11, the first lens 82a is supported by the carriage 81 via the tracking mechanism 83, while the second lens 82b is held by the slider 80. To perform the tracking control, the first lens 82a is moved in the radial direction of the disk D by the tracking mechanism 83.

The first lens 82a is larger than the second lens 82b so that it can properly receive the light from the light source. Due to the larger size, the first lens 82a is often heavier than the second lens 82b.

In the disk apparatus 8 of FIG. 11, the tracking mechanism 83 needs to have a heavy and complicated structure to move the relatively heavy lens 82a in the tracking direction. Unfavorably, such a mechanism tends to be expensive and consume much power during a data-processing operation. In addition, since the first lens 82a is heavy, the tracking movement of the lens 82a may not be quick enough, which is disadvantageous to achieving high-speed recording. Further, the overall thickness of the carriage 81 may unduly be large, since the first lens 82a and the tracking mechanism 83 are both mounted on the carriage 81.

In the disk apparatus 9 of FIG. 12, the first lens 92a and the second lens 92b (which constitute the lens system 92) are held by the slider 90. The tracking mechanism 93 includes a galvano-mirror supported by the swing arm 91. The light emitted from the light source 94a of an optical unit 94 is reflected on the galvano-mirror 93 and another mirror 95, to be directed upward. Then, the light passes through the lens system 92 to make a beam spot on the disk D.

In the above design, the deflection surface of the galvano-mirror 93 is minutely moved for performing tracking control, so that the beam spot on the disk D is caused to shift in the radial direction of the disk. In the disk apparatus 9, the relatively heavy first lens 92a is mounted on the slider 90 together with the second lens 92b. Since the slider 90 can automatically adjust its posture and spacing with respect to the disk D, no additional device is needed on the swing arm 91 for performing the focusing control of the first lens 92a. Accordingly, the swing arm 91 is made slim. Further, in the apparatus 9, the tracking control is performed by driving the galvano-mirror 93 but not the objective lenses. Thus, the tracking operation does not need much power, and the tracking response is satisfactory. However, the galvano-mirror 93 costs much in production, and this makes the product mirror 93 expensive.

SUMMARY OF THE INVENTION

The present invention has been proposed under the circumstances described above. It is, therefore, an object of the present invention to provide an economical optical disk apparatus which is simple in structure but exhibits fast response in performing tracking control.

According to the present invention, there is provided an optical disk apparatus including: an objective lens system for producing a beam spot on an optical disk by converging light from a light source; a slider movable relative to the optical disk; and a fine tracking mechanism for shifting the beam spot in a radial direction of the optical disk. The objective lens system includes a first lens and a second lens smaller (in size and weight) than the first lens. The second lens is held by the slider and disposed closer to the optical disk than the first lens is. The tracking mechanism shifts the second lens in the radial direction of the optical disk.

With the above arrangement, since the tracking control is performed by shifting the smaller second lens, the apparatus does not need much driving power, which is advantageous to reducing the running cost. Also, the smaller second lens can be accelerated more readily than the first lens. Thus, it is possible to perform fast tracking control, with a compact tracking mechanism, upon receiving a tracking control signal.

Preferably, the first lens may be held by the slider. In this case, the overall thickness of the disk apparatus can be small.

Preferably, the fine tracking mechanism may include an electrostatic actuator.

Preferably, the electrostatic actuator may include a moving element and a fixed element, wherein the moving element holds the second lens and is provided with first conductive comb-like teeth, while the fixed element is provided with second conductive comb-like teeth alternating with the first conductive comb-like teeth. The moving element may be shifted in the radial direction of the optical disk upon voltage application between the first conductive comb-like teeth and the second conductive comb-like teeth.

Preferably, the disk apparatus of the present invention may further include a transparent layer attached to the slider and facing the optical disk. The second lens may be held by the slider in a manner such that an air layer intervenes between the second lens and the transparent layer.

Preferably, the disk apparatus of the present invention may further include a magnetic field-generating coil embedded in the transparent layer.

Preferably, the moving element may include a pair of fins extending oppositely from each other. Further, the first conductive comb-like teeth may extend perpendicularly to the longitudinal direction of the fins.

Preferably, the moving element may include a body formed with a hole for holding the second lens. The body may be supported by elastic members so as to shift in the radial direction of the optical disk.

Preferably, the fixed element may include first and second conductive parts spaced from each other in the radial direction of the optical disk. Each of the second conductive comb-like teeth may extend from one of the first and the second conductive parts in the radial direction of the optical disk.

Preferably, the disk apparatus of the present invention may further include a switch for selectively applying voltage to one of the first and the second conductive parts of the fixed element.

Other features and advantages of the present invention will become apparent from the detailed description given below with reference to the accompanying drawings.

DETAILED DESCRIPTION OF THE PREFERRED EMBODIMENT

Preferred embodiments of the present invention will be described below with reference to the accompanying drawings.

Figure 1:
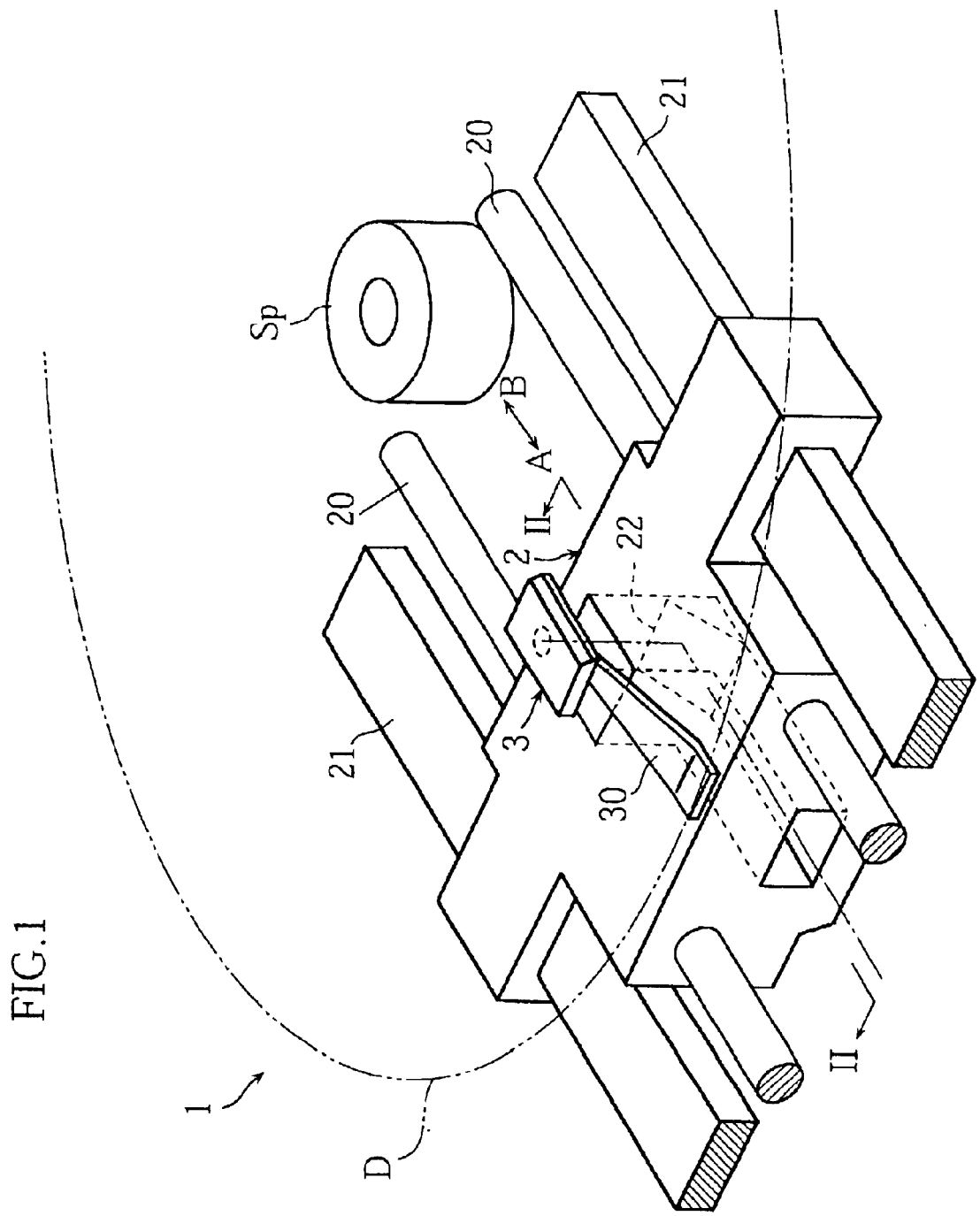
FIG. 1 is a perspective view showing an optical head incorporated in an optical disk apparatus embodying the present invention.
Figure 2:
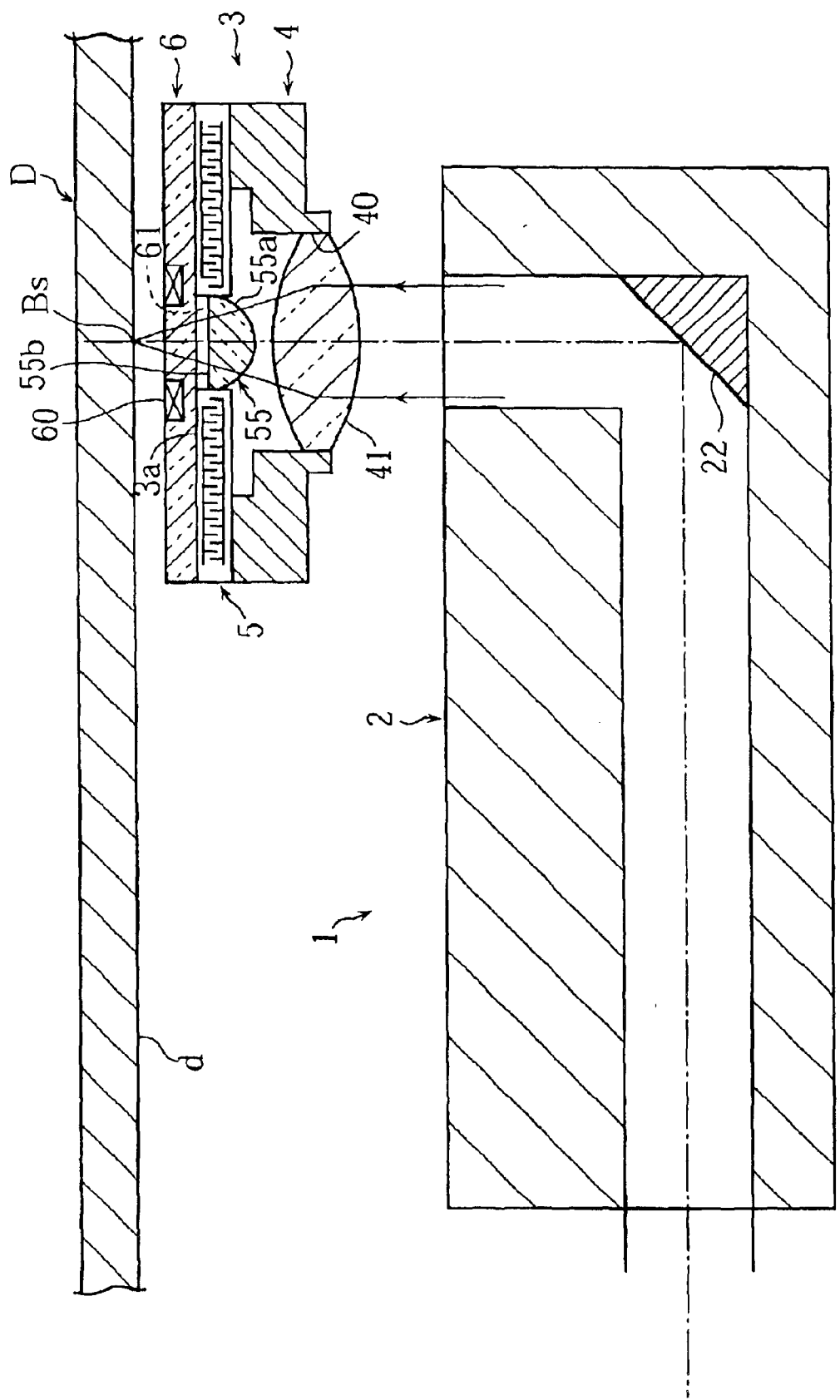
FIG. 2 is a sectional view taken along lines II—II in FIG. 1.

FIGS. 1 and 2 show the principal components of an optical disk apparatus (generally indicated by the numeral 1) according to the present invention. The disk apparatus 1 includes a spindle Sp to rotate an optical data storage disk D. In the illustrated example, data-recording to the disk D is performed by magnetic field modulation, while data reading from the disk D is performed by optical means. The disk D has a lower surface d under which a pair of guide rods 20 is provided for slidably supporting a carriage 2. The guide rods 20 extend in a radial direction of the disk D, so that the carriage 2 is moved in the tracking direction (see the double-headed arrow A-B) by a linear actuator 21 such as a voice coil motor.

As best shown in FIG. 2, the carriage 2 is provided with a mirror 22 disposed under a slider 3. A light source (not shown) emits a laser beam toward the mirror 22, and this beam is reflected upward by the mirror 22. Then, the laser beam enters a first lens 41 held by the slider 3.

The slider 3 is supported by the carriage 2 via a suspension 30. The slider 3 is pivotally attached to the distal end of the suspension 30 via a gimbal spring disposed between the slider 3 and the distal end of the suspension 30.

Figure 3:
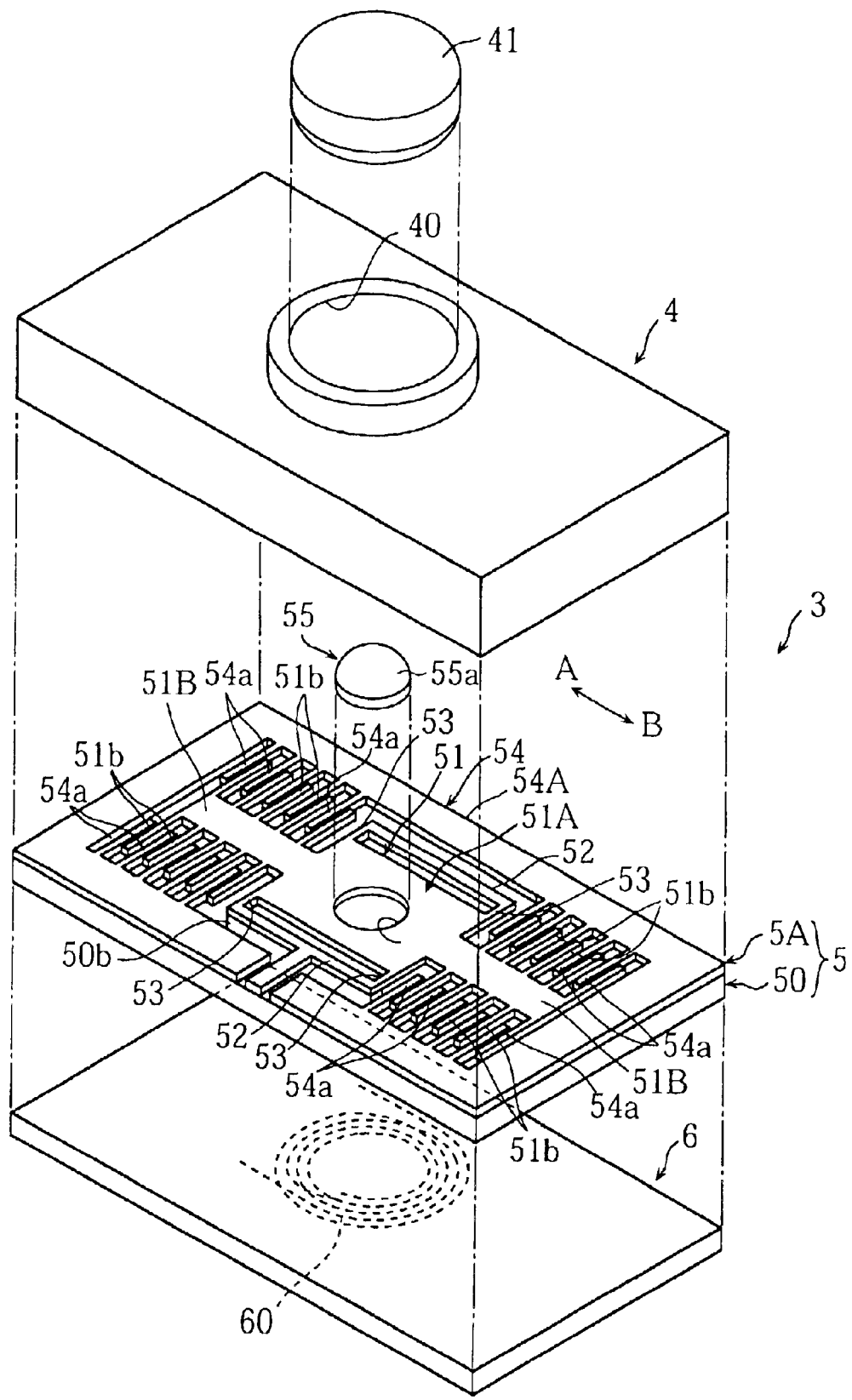
FIG. 3 is an exploded view showing the principal components of a slider used for the optical head shown in FIG. 1.

As shown in FIG. 2 or 3, the slider 3 is provided with a first lens holder 4 and an electrostatic actuator 5. The slider 3 has a front surface 3a that faces the lower surface d of the disk D. A transparent plate 6 is attached to the front surface 3a of the slider 3.

As shown in FIG. 3, the first lens holder 4 is formed with a center hole 40 into which the first lens 41 is fitted. The first lens 41, made of glass for example, has a diameter (maximum diameter) of 2~4 mm and a weight of 5~10 mg.

The electrostatic actuator 5 is composed of a silicon substrate 50 and a conductive layer 5A formed on the substrate 50. As will be described in detail below, the conductive layer 5A includes a moving element 51, supporting elements 52 (each including spring portions 53) and a fixed element 54.

Figure 5:
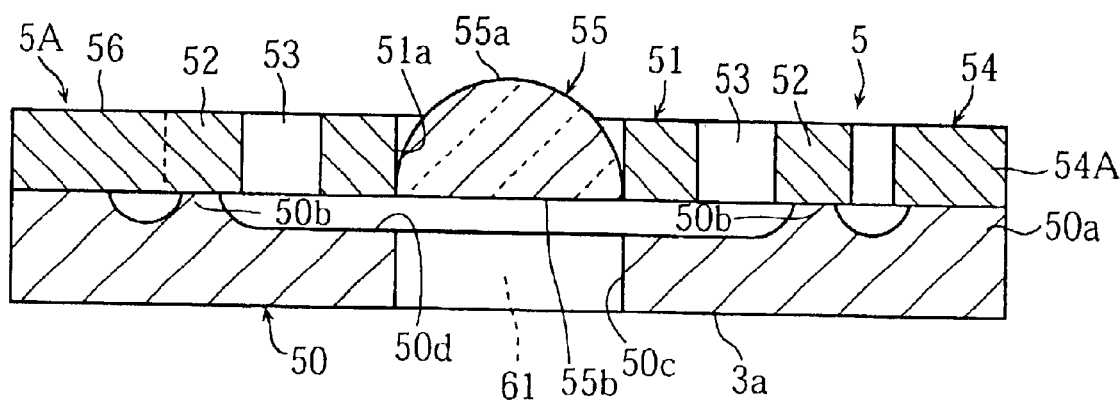
FIG. 5 is a sectional view taken along lines V—V in FIG. 4.
Figure 6:
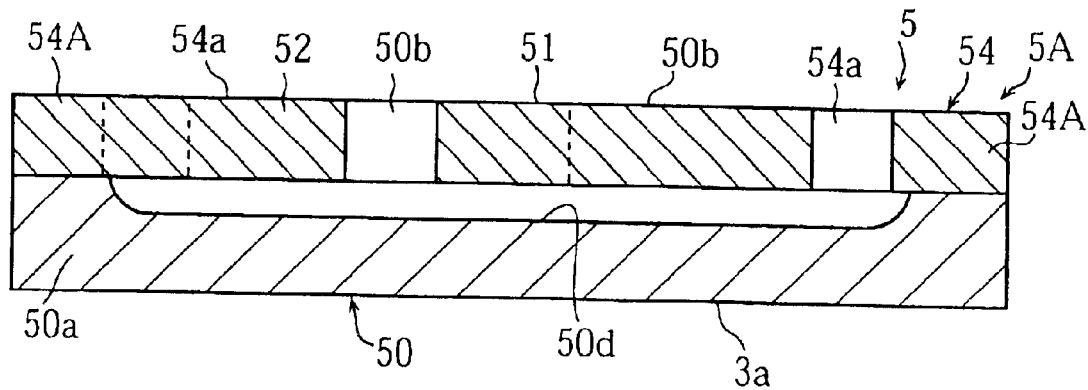
FIG. 6 is a sectional view taken along lines VI—VI in FIG. 4.

As shown in FIGS. 5 and 6, the silicon substrate 50 is provided with a rectangular frame-like projection 50a and a pair of supporting projections 50b. As shown in FIG. 5, the supporting projections 50b are disposed under the supporting elements 52 flanking the moving element 51.

The moving element 51 (shown by the crosshatching in FIG. 4) is composed of a rectangular body 51A, a pair of strips or fins 51B extending from the body 51A in opposite directions, and a plurality of conductive comb-like teeth 51b extending from the fins 51B. The body 51A is formed with a center hole 51a into which a second lens 55 is fitted. As seen from FIG. 5, the second lens 55 is a hemispheric solid immersion lens (SIL) having a curved surface 55a and a flat surface 55b. The weight of the second lens 55 is 0.3~1.0 mg, and the diameter of the flat surface 55b is 0.7~1.5 mm.

Figure 4:
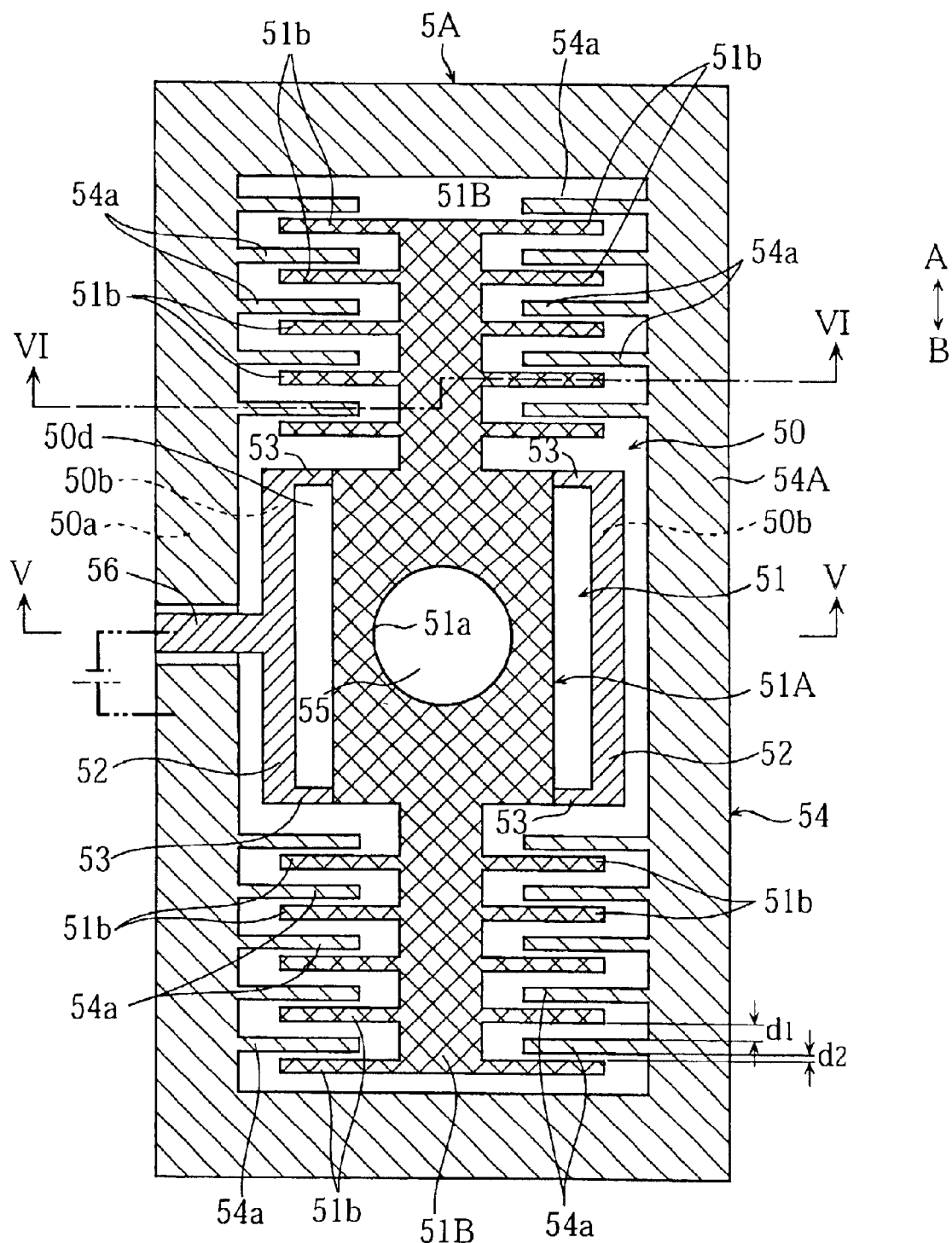
FIG. 4 is a plan view showing an electrostatic actuator incorporated in the slider shown in FIG. 3.

As shown in FIG. 4, in each fin 51B, the parallel comb-like teeth 51b extend perpendicularly to the longitudinal direction of the fin 51B and are spaced from each other by a constant pitch.

Each of the supporting elements 52 (two supporting elements are provided in the illustrated example) is connected at its respective ends to the moving element 51 via the spring portions 53. Thus, as shown in FIGS. 5 and 6, the moving element 51 together with the second lens 55 is spaced upward from the inner bottom surface 50d of the silicon substrate 50. As shown in FIG. 5, the substrate 50 is formed with a center hole 50c concentric with the second lens 55. As noted above, the substrate 50 is attached to the transparent plate 6 (see FIG. 3). The second lens 55 is held in facing relation to the plate 6 via an air layer 61 (see FIG. 2). As shown in FIGS. 3 and 4, one of the supporting elements 52 is connected to the frame-like projection 50a of the substrate 50 via a leading portion 56. The required driving voltage is applied between the moving element 51 (via the lead 56) and the fixed element 54.

In FIG. 4, the fixed element 54, indicated by the single hatching, comprises a frame 54A extending along the projection 50a of the silicon substrate 50. As illustrated, the frame 54A is provided with a plurality of comb-like teeth 54a ("second comb-like teeth") cooperating with the above-mentioned comb-like teeth 51b ("first comb-like teeth") of the moving element 51. The second comb-like teeth 54a can be divided into four groups (the upper right, the lower right, the upper left and the lower left). In each group, all the comb-like teeth 54a except one are sandwiched between the adjacent first comb-like teeth 51b. As shown, the spaces $d_1$ and $d_2$ between a second comb-like tooth 54a and the adjacent first comb-like teeth 51b are nonequal ($d_1 > d_2$).

Referring now to FIGS. 7A~7E and 8A~8D, the electrostatic actuator 5 may be produced from a silicon wafer by applying a semiconductor device fabrication process. The cross sections shown in these figures correspond to the cross section shown in FIG. 6.

Figure 7A:
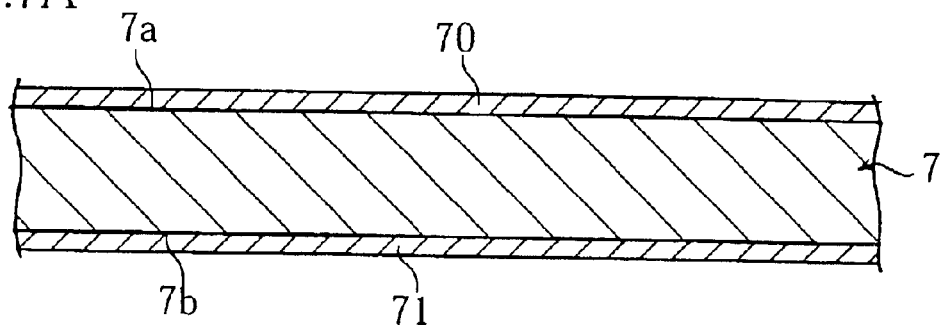
FIGS. 7A~7E and 8A~8D show the principal steps of a method of making the electrostatic actuator shown in FIGS. 4~6.

First, as shown in FIG. 7A, oxide layers (SiO$_2$) 70 and 71 are formed on the (100)-cut upper surface 7a and the (100)-cut lower surface 7b of a silicon wafer 7, respectively. The oxide layers 70, 71 may be formed by subjecting the silicon wafer 7 to wet oxidation conducted at a temperature between 1050~1150° C. for 6~10 hours. As a result of this, the upper and the lower surfaces 7a, 7b of the wafer 7 are oxidized, to provide the silicon oxide layers.

Figure 7B:
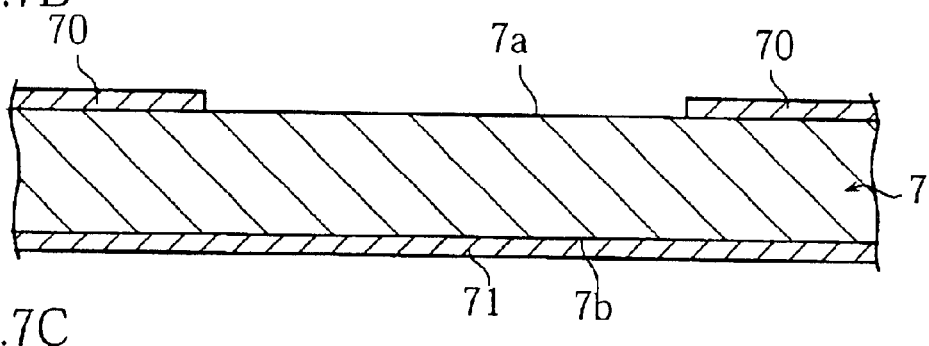

Then, as shown in FIG. 7B, the upper oxide layer 70 is partially removed from the prescribed part of the wafer 7 by ion trimming for example. In this particular part of the wafer 7, the above-described moving element 51, the spring portions 53 and the second comb-like teeth 54a are to be formed.

Figure 7C:
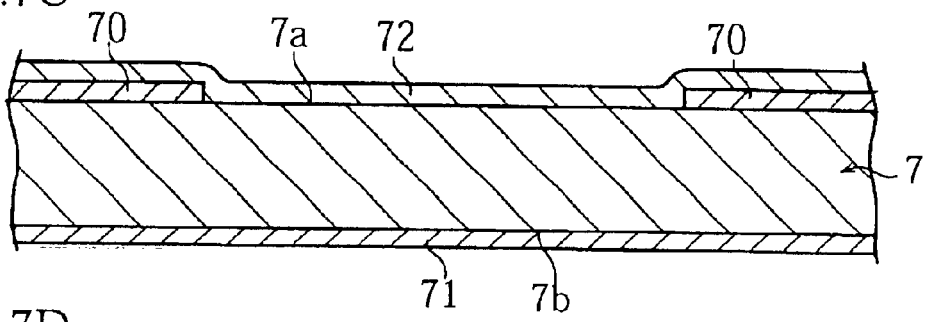

Then, as shown in FIG. 7C, an aluminum layer 72 is formed on the upper side of the wafer 7. The aluminum layer 72 may be formed by a known technique such as vapor deposition or sputtering.

Figure 7D:
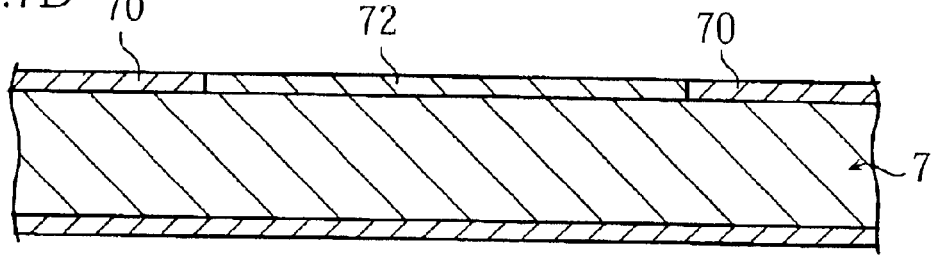

Then, as shown in FIG. 7D, the aluminum layer 72 is partially removed by ion trimming for example, so that the remaining aluminum layer 72 is flush with the upper oxide layer 70, thereby forming a single layer.

Figure 7E:
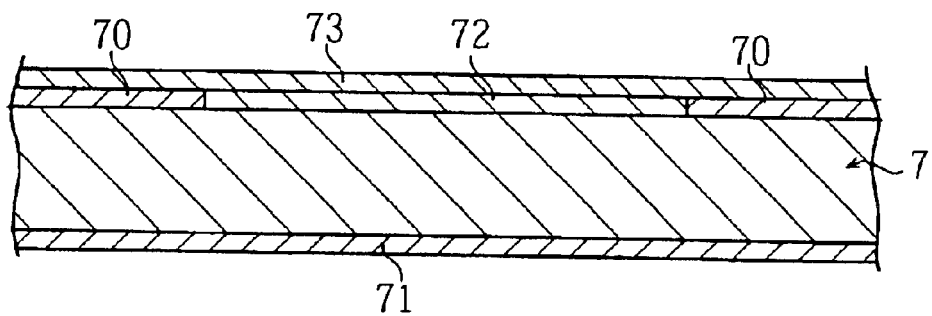

Then, as shown in FIG. 7E, a nickel layer 73 is formed on the oxide layer 70 and the aluminum layer 71. The nickel layer 73 may be formed by a known technique such as vapor deposition or sputtering.

Figure 8A:
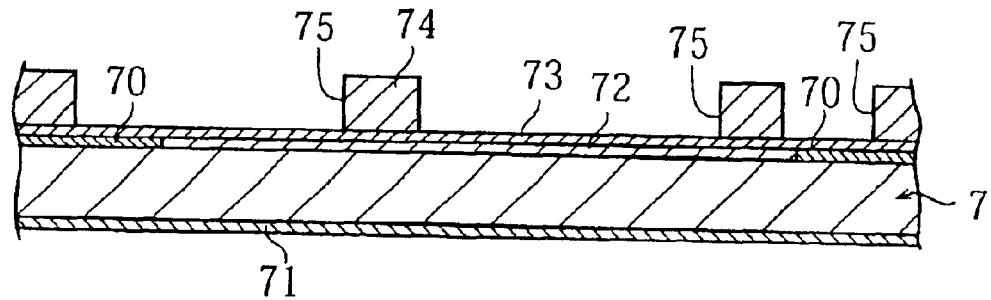

Then, as shown in FIG. 8A, a mask 74 is formed on the nickel layer 73. The mask 74 is provided with several openings 75 corresponding to the regions to be formed into the moving element 51, the supporting elements 52, the spring portions 53 and the fixed element 54. The mask 74 is formed as a photoresist made by photolithography.

Figure 8B:
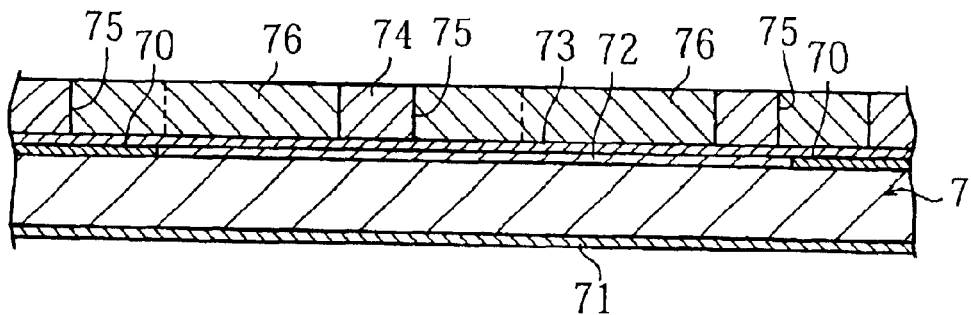

Then, as shown in FIG. 8B, the openings 75 of the mask 74 are filled with nickel 76 by plating for example.

Figure 8C:
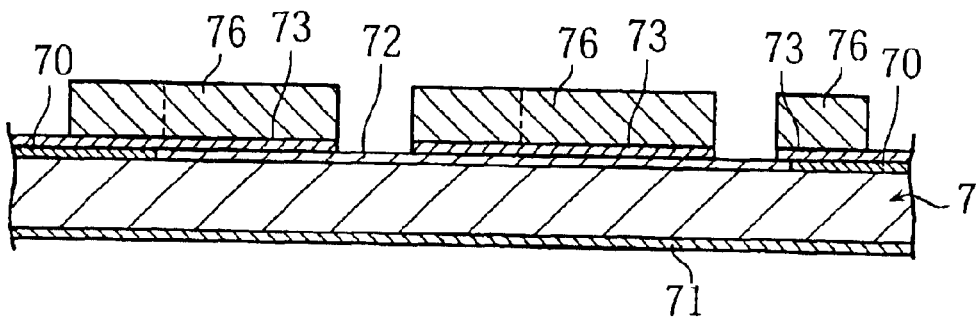

Then, as shown in FIG. 8C, the mask 84 is removed by wet etching with the use of an organic solvent. Thereafter, the exposed portions of the nickel layer 73 are removed by ion trimming.

Figure 8D:
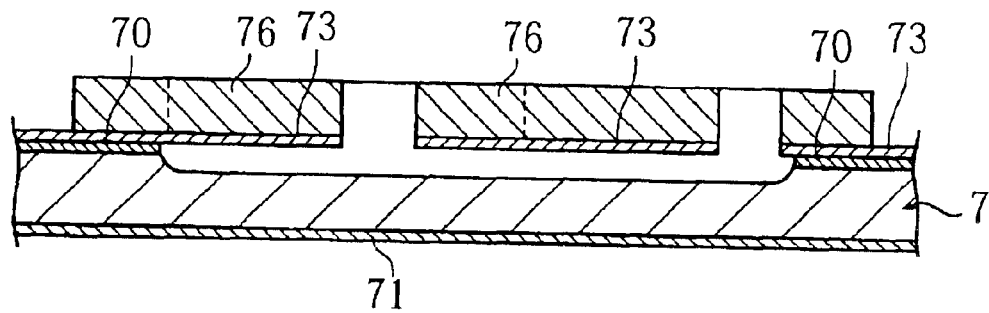

Then, as shown in FIG. 8D, the exposed portions of the aluminum layer 72 are removed by wet etching. When the etchant is KOH solution for example, the surface of the wafer 7 is also etched in a manner such that the moving element 51 is formed to be spaced upward from the wafer 7. Finally, the wafer 7 is subjected to dicing, and individual actuators 5 (as shown in FIGS. 3 and 4) are obtained from a single silicon wafer. Such a collective fabrication method is advantageous to reducing the production cost.

As shown in FIG. 3, the transparent plate 6 is provided with a coil 60 embedded therein. In operation, the coil 60 produces a magnetic field to enable the data recording by magnetic field modulation. The coil 60 may be made by patterning a copper layer for example. For insulation, the coil 60 is coated with a transparent material such as aluminum oxide, aluminum nitride, diamond-like carbon, silicon oxide or silicon nitride.

When a high-frequency current passes through the coil 60 for performing high-speed recoding, the coil 60 may generate much heat. Without taking any countermeasures, this thermal energy would heat the second lens 55 to an extent that the refractive index of the lens is unacceptably changed, thereby causing aberration. In the illustrated embodiment, however, an air layer 61 is provided between the coil 60 and the second lens 55. With such an arrangement, it is possible to prevent the unfavorable heating of the second lens 55. Accordingly, the above-mentioned aberration will not occur.

Referring to FIG. 4, upon application of the required voltage between the moving element 51 and the fixed element 54, the moving element 51 is minutely moved in the A or B direction relative to the fixed element 54.

More specifically, when voltage is applied between the moving element 51 and the fixed element 54, each of the first comb-like teeth 51b is attracted toward the closer one of the adjacent second comb-like teeth 54a ($d_1 > d_2$) by electrostatic force. Thus, upon the voltage application, the moving element 51 is moved in the A-direction in FIG. 4. This holds when the polarity of the applied voltage is reversed. As well known, the displacement of the moving element 51 becomes greater as the applied voltage is higher.

Figure 9A:
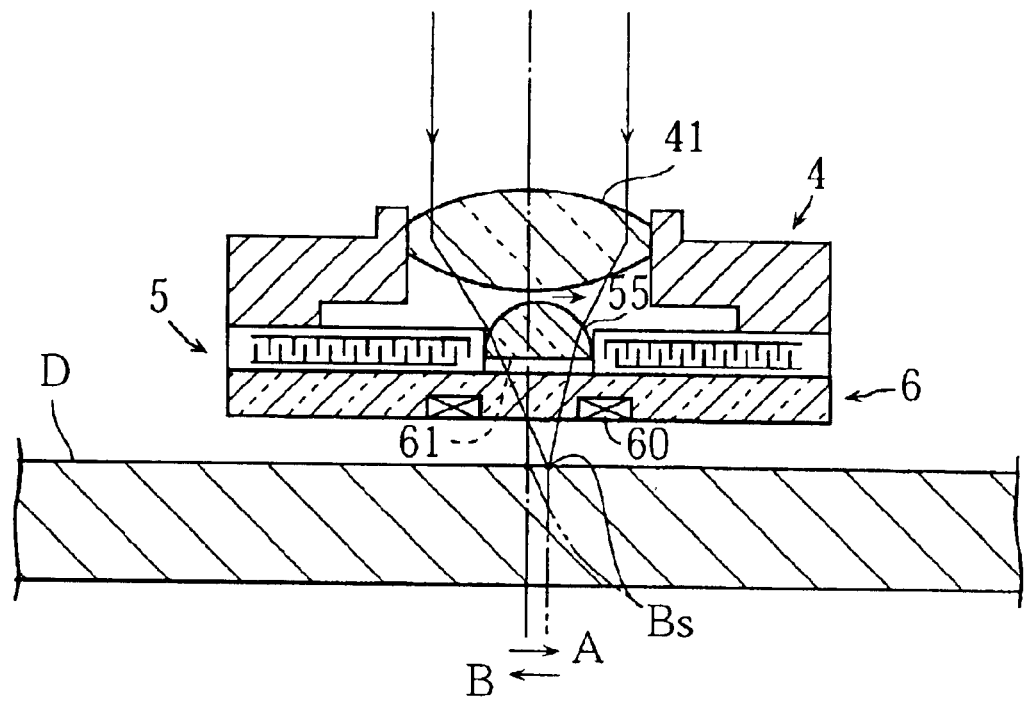
FIGS. 9A and 9B illustrate how tracking control is performed in the optical head of the present invention.
Figure 9B:
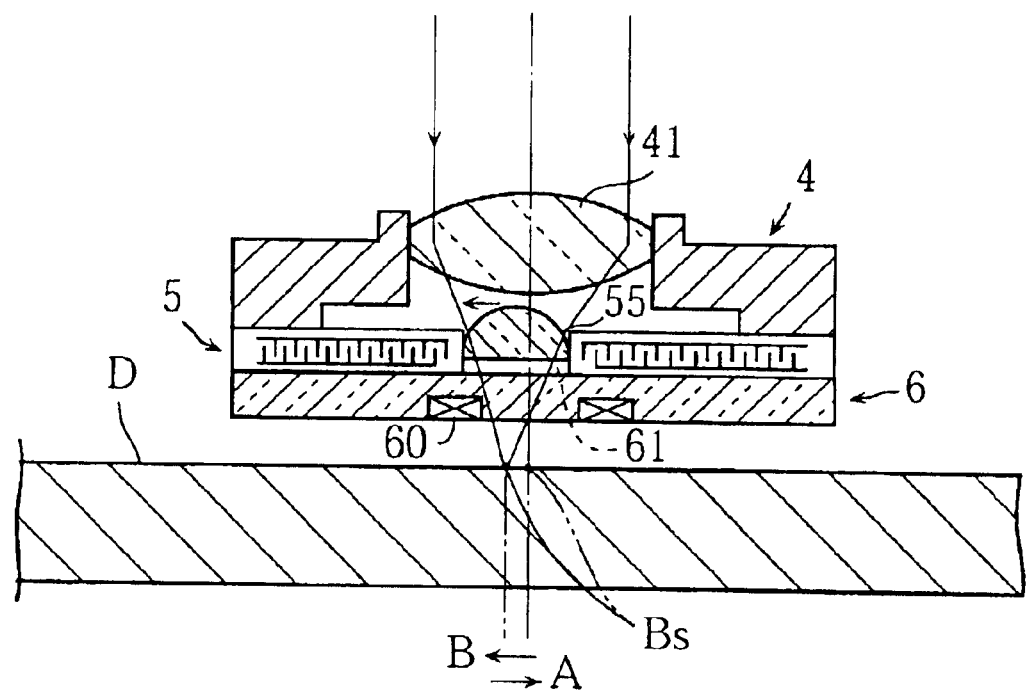

Supposing that the operation starts from the 0-voltage state, the moving element 51 is moved only in the A-direction upon voltage application despite the polarity of the voltage. It is necessary, however, to make the element 51 movable in both the A-direction and the opposite B-direction in order to perform the tracking control properly. To this end, in the illustrated embodiment, the initial voltage between the moving element 51 and the fixed element 54 is set to a nonzero value, so that the moving element 51 is "preshifted." With this arrangement, it is possible to move the element 51 in the A-direction by applying a greater voltage than the prescribed nonzero value. On the other hand, when the applied voltage is lower than the nonzero value, the element 51 is moved in the B-direction. For instance, referring to FIG. 9A, the beam spot Bs is initially off the target in the B-direction, a greater voltage than the prescribed nonzero value is applied between the moving element 51 and the fixed element 54 to correct the position of the second lens 55. On the other hand, the beam spot Bs is initially off the target in the A-direction, as shown in FIG. 9B, a lower voltage than the prescribed nonzero value is applied.

How much the second lens 55 should be displaced (in other words, what voltage should be applied) is determined in accordance with a tracking signal indicating the extent of the deviation of the current beam spot from the target track. The tracking signal is generated by a push-pull method applied to the electrical output from an optical detector (e.g., photoelectric converter) to receive the reflected light from the optical disk D.

As noted above, fine tracking control is carried out by shifting the second lens 55 which is smaller in size and weight than the first lens 41. Specifically, the diameter of the second lens 55 may be ⅕~½ of that of the first lens 41, and the weight of the second lens 55 may be 1/20~1/10 of that of the first lens 41. Advantageously, the tracking control of such a small and light lens does not need much driving power and can reduce the running cost. Further, the tracking control is carried out immediately upon receiving a tracking signal.

Figure 10:
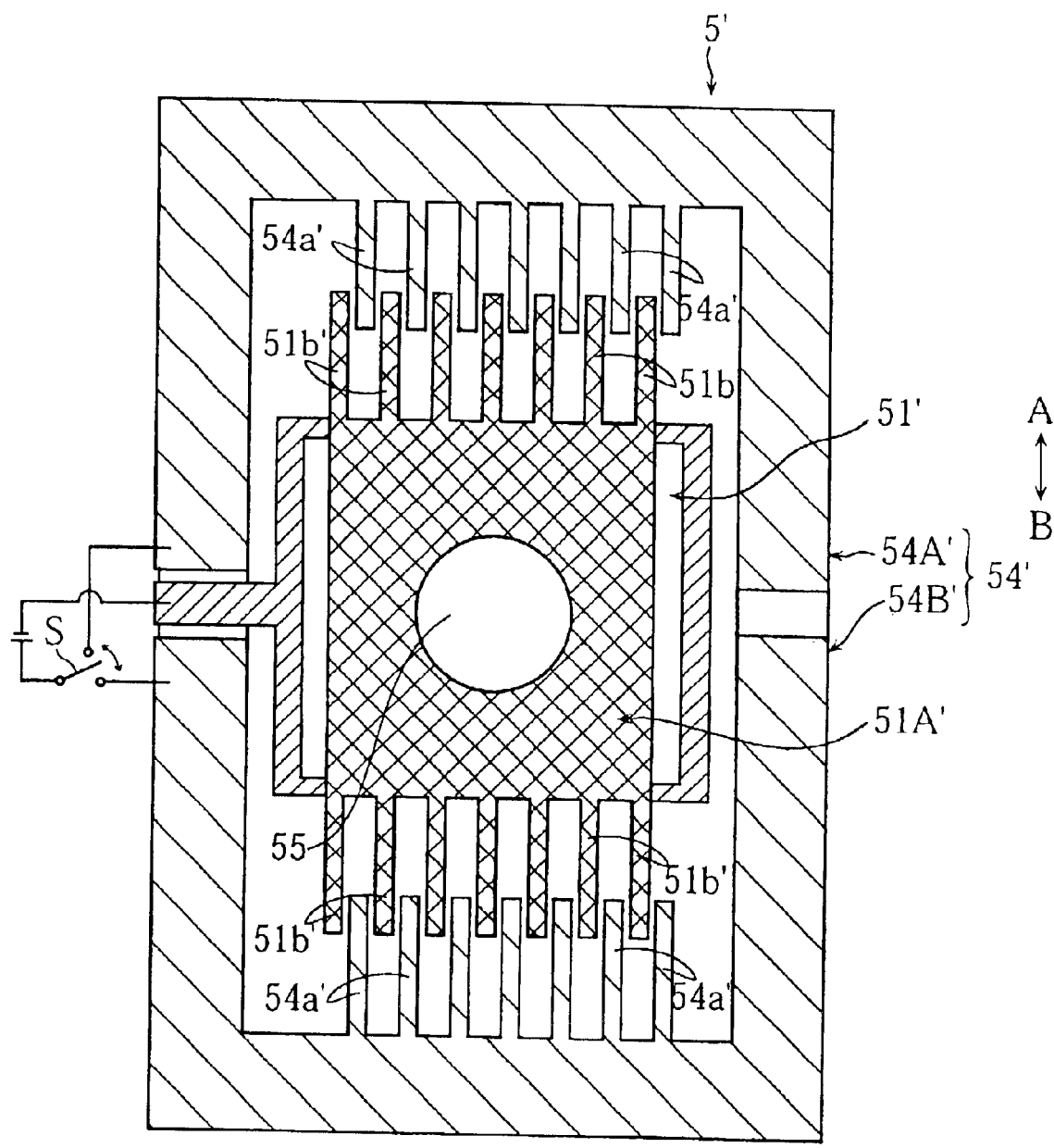
FIG. 10 is a plan view showing a different example of an electrostatic actuator used for the optical head of the present invention.
Figure 11:
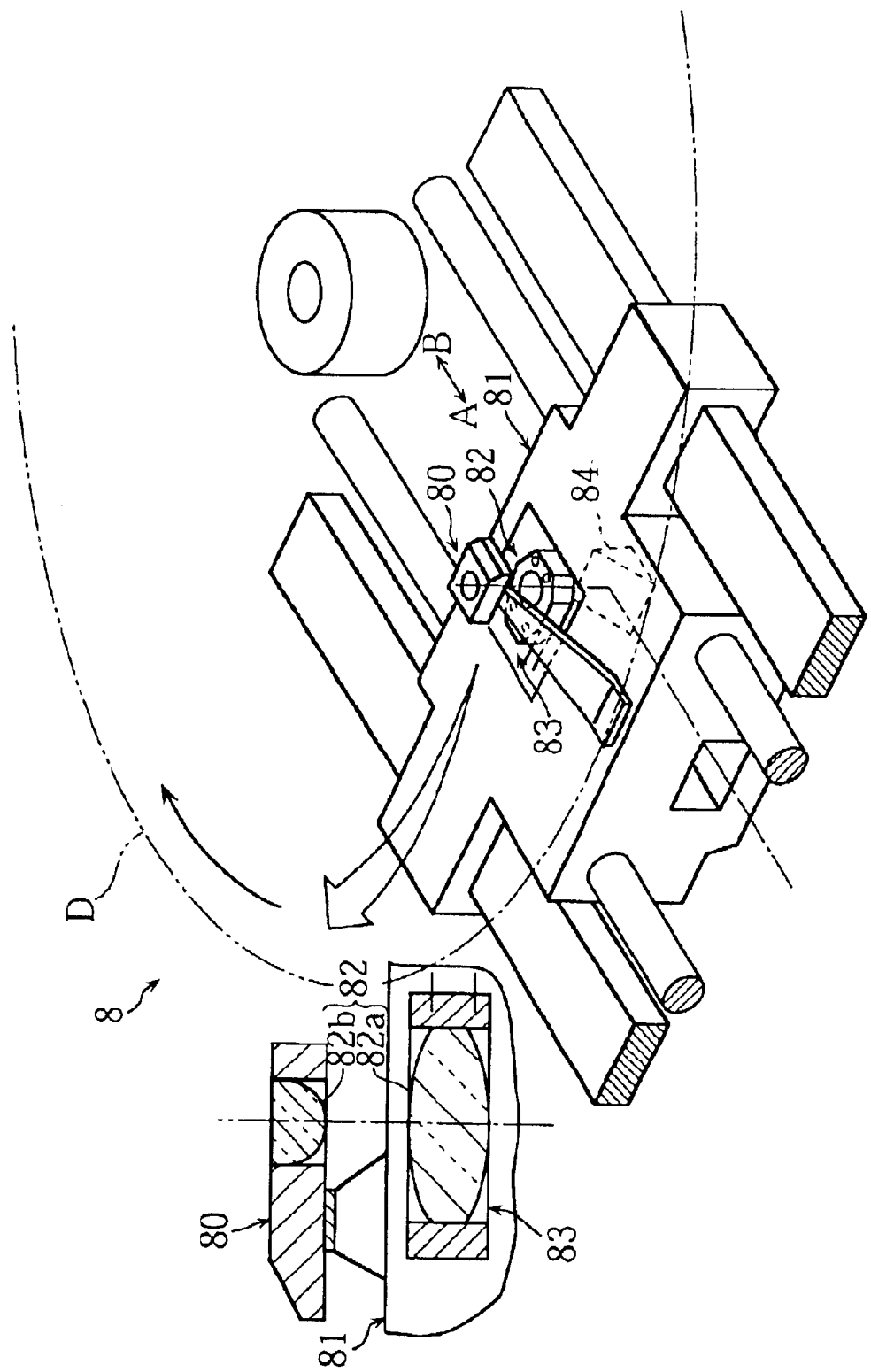
FIG. 11 is a perspective view showing a conventional optical head used for an optical disk apparatus.
Figure 12:
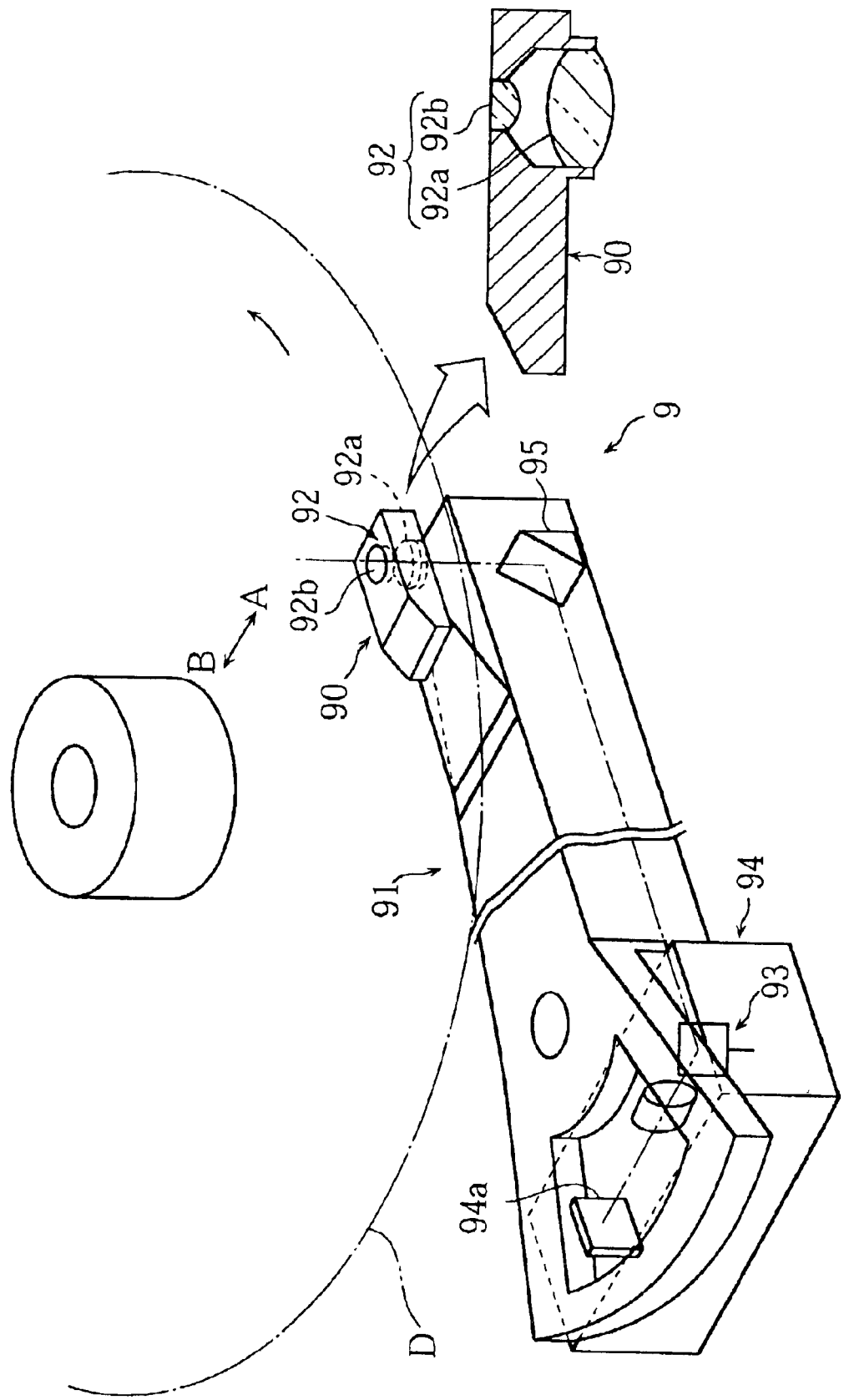
FIG. 12 is a perspective view showing a conventional swing-arm type optical head.

Reference is now made to FIG. 10 showing another example of an electrostatic actuator. The illustrated actuator 5', as in the actuator 5 descried above, includes a moving element 51' and a fixed element 54'. The moving element 51' is provided with a plurality of first conductive comb-like teeth 51b', while the fixed element 54' is provided with a plurality of second conductive comb-like teeth 54'.

Differing from those of the actuator 5 shown in FIG. 4, the first comb-like teeth 51b' shown in FIG. 10 extend directly from a body 51A' of the moving element 51'. The fixed element 54' is composed of two parts 54A' and 54B'. The power source is connected to the moving element 51' permanently, while it is connected selectively to the first part 54A' or second part 54B' by a switch S. The second comb-like teeth 54a' are divided into two equal groups one of which is provided on the first part 54A' and the other of which is provided on the second part 54B'. As shown in FIG. 10, the first and the second comb-like teeth 51a' 54a' are arranged alternately. Differing from those of the previous actuator 5, the alternating first and second comb-like teeth 51b', 54a' are disposed by a constant pitch. Thus, any second comb-like tooth 54a' flanked by two adjacent first comb-like teeth 51b' is equally spaced from the first teeth 51b'.

To operate the actuator 5' for performing tracking control, the required voltage is applied between the moving element 51' and the first part 54A' of the fixed element 54' or between the moving element 51' and the second part 54B' of the fixed element 54'. In the former case, the moving element 51' (hence the second lens 55) is moved in the A-direction, and in the latter case, the moving element 51' is moved in the B-direction.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical disk apparatus comprising:
   an objective lens system for producing a beam spot on an optical disk by converging light from a light source;
   a slider movable relative to the optical disk, the slider including a lens holder; and
   a fine tracking mechanism for shifting the beam spot in a radial direction of the optical disk;
   wherein the objective lens system includes a first lens fixed to the lens holder and a second lens which is smaller than the first lens and held by the lens holder via the fine tracking mechanism, the second lens being closer to the optical disk than the first lens is; and
   wherein the fine tracking mechanism shifts the second lens, relative to the first lens, in the radial direction of the optical disk.

2. The apparatus according to claim 1, wherein the fine tracking mechanism comprises an electrostatic actuator.

3. The apparatus according to claim 2, wherein the electrostatic actuator comprises a moving element and a fixed element, the moving element holding the second lens and being provided with first conductive comb-like teeth, the fixed element being provided with second conductive comb-like teeth alternating with the first conductive comb-like teeth, and wherein the moving element is shifted in the radial direction of the optical disk upon voltage application between the first conductive comb-like teeth and the second conductive comb-like teeth.

4. The apparatus according to claim 1, further comprising a transparent layer attached to the slider and facing the optical disk, wherein the second lens is held by the slider in a manner such that an air layer intervenes between the second lens and the transparent layer.

5. The apparatus according to claim 4, further comprising a magnetic field-generating coil embedded in the transparent layer.

6. The apparatus according to claim 3, wherein the moving element includes a pair of fins extending oppositely from each other, and wherein the first conductive comb-like teeth extend perpendicularly to a longitudinal direction of the fins.

7. The apparatus according to claim 3, wherein the moving element comprises a body formed with a hole for holding the second lens, the body being supported by elastic members so as to shift in the radial direction of the optical disk.

8. The apparatus according to claim 3, wherein the fixed element comprises first and second conductive parts spaced from each other in the radial direction of the optical disk, each of the second conductive comb-like teeth extending from one of the first and the second conductive parts in the radial direction of the optical disk.

9. The apparatus according to claim 8, further comprising a switch for selectively applying voltage to one of the first and the second conductive parts of the fixed element.

10. An optical disk apparatus comprising:
    an objective lens system for producing a beam spot on an optical disk by converging light from a light source;
    a slider movable relative to the optical disk; and
    a fine tracking mechanism for shifting the beam spot in a radial direction of the optical disk;
    wherein the objective lens system includes a first lens and a second lens which is smaller than the first lens and held by the slider, the second lens being closer to the optical disk than the first lens is; and
    wherein the fine tracking mechanism comprises an electrostatic actuator for shifting the second lens in the radial direction of the optical disk.

11. The apparatus according to claim 10, wherein the electrostatic actuator comprises a moving element and a fixed element, the moving element holding the second lens and being provided with first conductive comb-like teeth, the fixed element being provided with second conductive comb-like teeth alternating with the first conductive comb-like teeth, and wherein the moving element is shifted in the radial direction of the optical disk upon voltage application between the first conductive comb-like teeth and the second conductive comb-like teeth.

12. The apparatus according to claim 11, wherein the moving element includes a pair of fins extending oppositely from each other, and wherein the first conductive comb-like teeth extend perpendicularly to a longitudinal direction of the fins.

13. The apparatus according to claim 11, wherein the moving element comprises a body formed with a hole for holding the second lens, the body being supported by elastic members so as to shift in the radial direction of the optical disk.

14. The apparatus according to claim 11, wherein the fixed element comprises first and second conductive parts spaced from each other in the radial direction of the optical disk, each of the second conductive comb-like teeth extending from one of the first and the second conductive parts in the radial direction of the optical disk.

15. The apparatus according to claim 14, further comprising a switch for selectively applying voltage to one of the first and second conductive parts of the fixed element.

16. An optical disk apparatus comprising:
    an objective lens system for producing a beam spot on an optical disk by converging light from a light source;
    a slider movable relative to the optical disk;
    a transparent layer attached to the slider and facing the optical disk;
    a fine tracking mechanism for shifting the beam spot in a radial direction of the optical disk;
    wherein the objective lens system includes a first lens and a second lens which is smaller than the first lens and held by the slider, the second lens being closer to the optical disk than the first lens is; and wherein the second lens is held by the slider in a manner such that an air layer intervenes between the second lens and the transparent layer.

17. The apparatus according to claim 16, further comprising a magnetic field-generating coil embedded in the transparent layer.

* * * * *